United States Patent
Carpenture, Jr. et al.

[15] 3,704,798
[45] Dec. 5, 1972

[54] TRUCK CARGO TRANSFER ASSEMBLY

[72] Inventors: Herbert L. Carpenture, Jr., Babylon, N.Y.; Oscar Green, Worthington, Ohio

[73] Assignee: Greif Bros. Corporation, Delaware, Ohio

[22] Filed: Feb. 3, 1971

[21] Appl. No.: 112,124

[52] U.S. Cl.............214/38 D, 214/83.22, 214/83.34
[51] Int. Cl. ............................................B60p 1/38
[58] Field of Search.......214/83.22, 83.34, 83.24, 38, 214/38 D; 296/28 M

[56] References Cited

UNITED STATES PATENTS

| | | | |
|---|---|---|---|
| 2,264,157 | 11/1941 | Baker et al. | 214/83.34 X |
| 3,498,482 | 3/1970 | Lewis | 214/83.22 |
| 3,578,186 | 5/1971 | Thomas | 214/83.22 |
| 3,399,794 | 9/1968 | Hummel | 296/28 M |
| 3,443,703 | 5/1969 | Matsumoto | 214/83.34 X |

*Primary Examiner*—Albert J. Makay
*Attorney*—Kane, Dalsimer, Kane, Sullivan & Kurucz

[57] ABSTRACT

An assembly for transferring the cargo of a truck to and from the truck front portion during loading and unloading procedures is provided herein. The assembly includes a longitudinally movable belt overlying the truck bed and having a front end coupled to a platform which, in turn, is coupled to a cable, and a rear end adapted to be coupled to a take-up drum. The drum may be mounted to the trailer frame or to an associated loading dock. The assembly also includes a cage unit extending about the front and sides of the platform and supported from overhead tracks.

5 Claims, 10 Drawing Figures

PATENTED DEC 5 1972

INVENTORS
HERBERT L. CARPENTER, JR.
OSCAR GREEN
BY
Kane, Dalsimer, Kane, Sullivan+Kurucz
ATTORNEYS

INVENTORS
HERBERT L. CARPENTER, JR.
OSCAR GREEN
BY
ATTORNEYS

INVENTORS
HERBERT L. CARPENTER, JR.
OSCAR GREEN
BY
ATTORNEYS 3,704,798

TRUCK CARGO TRANSFER ASSEMBLY

BACKGROUND OF THE INVENTION

One of the principal problems associated with the loading and unloading of trucks is that the truck crew must enter the truck trailer to deliver or remove the load at the front of the trailer. Mechanized fork lifts and the like have simplified the job of loading and unloading trucks. However, these devices do require a crew member to enter the trailer interior. Heretofore, conveyor arrangements have been suggested for truck trailers. However, such conveyors have met with limited success due to the difficulties associated with loading and unloading from a conventional conveyor without means for starting the load and preventing the load from falling off the conveyor. Also, in most modern large trailers, there is a raised front portion which is designed to fit over the rear wheels of the associated tractor. This raised portion is commonly known as the "bandstand" area. In such larger trailers, in addition to the problems discussed above, the bandstand presents particular problems of loading and unloading because of its inaccessibility to hand trucks, forklifts, and conveyor arrangements.

In view of the above, it is the principal object of the present invention to provide a cargo transfer assembly which facilitates the automated loading and unloading of truck trailers and which may readily be adapted for use with trailers having such a raised "bandstand" portion.

SUMMARY OF THE INVENTION

The above and other beneficial objects and advantages are attained in accordance with the present invention by providing a cargo transfer assembly for a trailer truck which includes a movable belt extending into the trailer from an openable rear end thereof. The rear of the belt is provided with means for coupling to a take-up drum, which may be affixed to the frame of the trailer itself or to an associated loading dock. The front end of the belt is connected to a platform adapted to move with the belt. Front and side wall members extend upwardly from the platform, supported for movement by wheels which ride in rails mounted to the trailer ceiling. A cable extends from the platform to a cable take-up roll which may similarly be affixed to the frame of the trailer itself or to an associated loading dock. A source of power may be applied to the belt take-up drum or cable take-up roll to obtain the desired movement of the assembly for loading or unloading procedures.

BRIEF DESCRIPTION OF THE DRAWINGS

Two embodiments of the present invention are illustrated in the accompanying drawings and described in the following detailed description. In the first embodiment, the belt take-up drum and cable take-up roll are not mounted to the trailer, while in the second embodiment they are mounted directly to the trailer. Further, two variations of a trailer interior are shown. In the first variation, the entire trailer bed is flat, while in the second variation the trailer bed has a raised bandstand portion. The first variation is shown with the first embodiment and the second variation is shown with the second embodiment. It should be understood that this arrangement was chosen merely as a matter of convenience in describing the present invention and that either trailer variation could be used with either transfer assembly embodiment.

Accordingly, in the accompanying drawings.

DETAILED DESCRIPTION OF THE PREFERRED EMBODIMENTS

Figure 1:
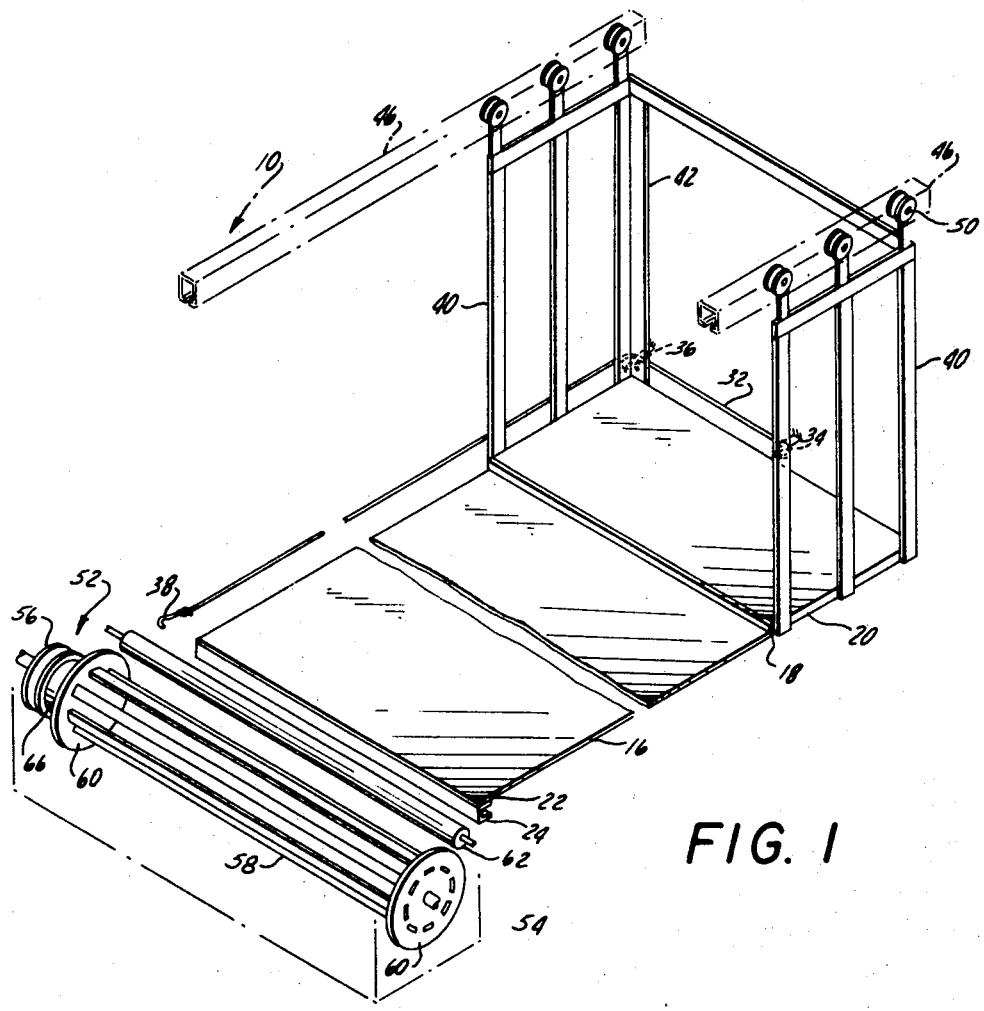
FIG. 1 is a schematic representation of the first embodiment of the cargo transfer assembly of the present invention wherein the conveyor belt take-up drum and cable take-up roll are separated from a trailer which has a completely flat bed.
Figure 6:
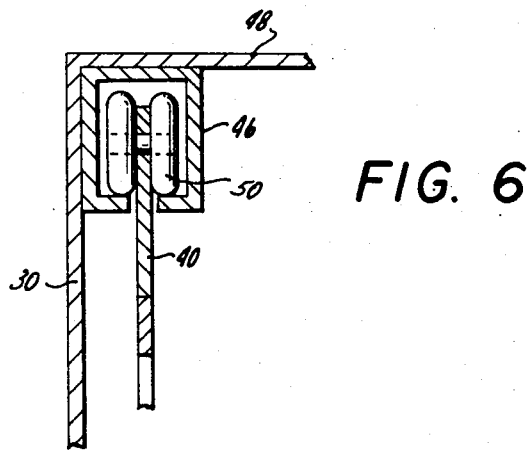
FIG. 6 is an enlarged fragmentary elevational sectional view taken along reference line 6—6 of FIG. 2 in the direction indicated by the arrows.

Reference is now made to the drawings wherein similar components bear the same reference numerals throughout the several views. As previously stated, FIGS. 1–6 relate to a first embodiment of the present invention wherein the components of the present cargo transfer assembly 10 are divided between a trailer truck 12 and an associated loading dock 14 and FIGS. 7–10 relate to a second embodiment of the present invention wherein all the components of the cargo transfer assembly 110 are mounted in truck trailer 112.

Reference is now made to FIGS. 1–6 in particular wherein the first embodiment of the cargo transfer assembly 10 of the present invention is shown to comprise a flexible movable belt 16 having a forward end 18 coupled to a rigid platform 20 and a rear end 22 which terminates in a hooked connector 24.

Figure 2:
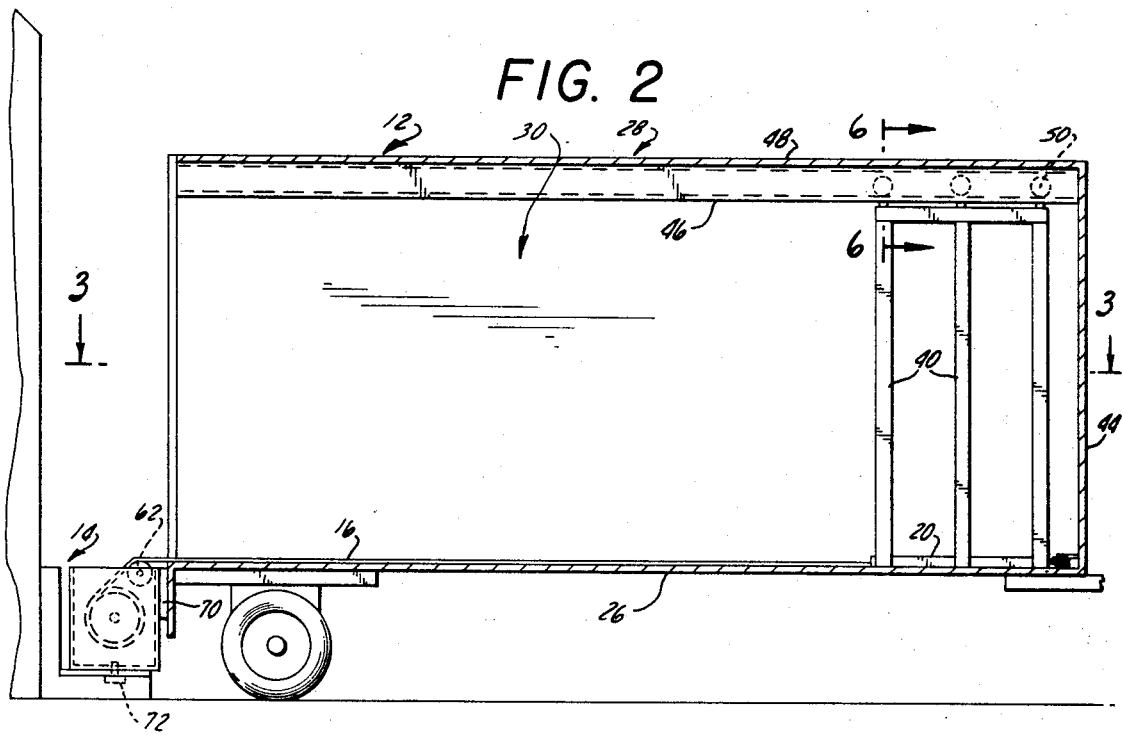
FIG. 2 is a side elevation sectional view of a trailer and loading dock equipped with the cargo transfer assembly of FIG. 1.
Figure 3:
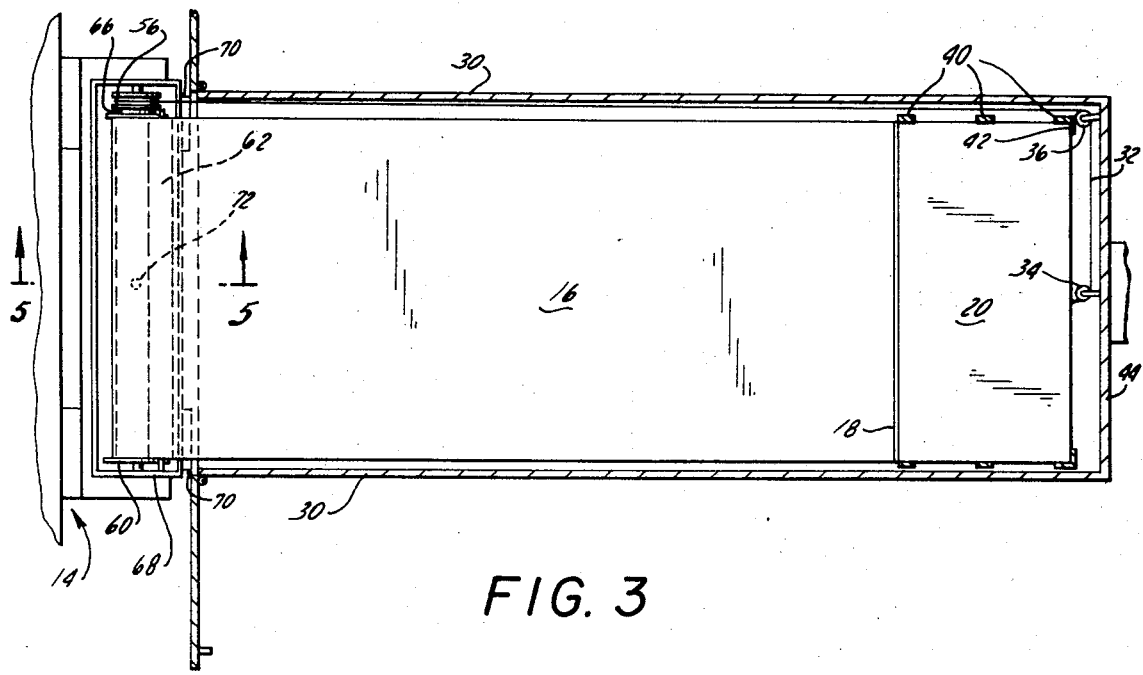
FIG. 3 is a plan view taken along reference line 3—3 of FIG. 2 in the direction indicated by the arrows.

As shown in FIGS. 2 and 3, the belt 16 and platform 20 overlie substantially the entire bed 26 of trailer 28 with the platform 20 at the forward end of the trailer when the belt 16 is fully extended. As shown in FIG. 3, the belt 16 is somewhat less than the full width of the inside of truck 28 which serves to facilitate movement of the belt along the truck bed with less chance for chafing against the sides 30 of the trailer due to any misalignment.

The conveyor belt contemplated for use in the present invention is of a type readily available to the trade. The lower surface of the belt is preferably smooth so as to provide easy slippage along the bed of the truck. The top surface should be formed of a tough wear-resistant material, such as synthetic rubber or the like, which will permit the trailer loading to be placed in the trailer and will hold it adequately while at the same time resist scuffing, abrasion, etc. The entire belt should be of a weatherproof construction so that it will not stretch, warp, shrink or otherwise change its shape and direction during the time of its use. The belt must be sufficiently strong to withstand a longitudinal force necessary to move it when fully loaded. As previously mentioned, there are readily available commercial belts having all of these features.

A cable 32 extends from the center of platform 20 about pulleys 34 and 36 which are fixed to the trailer frame and then rearwardly along a side of the trailer toward a connection hook 38. The cable must be formed of a material sufficiently strong to withstand the tension which must be applied to move the conveyor belt and platform when fully loaded.

Referring again to FIG. 1, it may be noted that platform 20 forms the base of a cage which is further defined by sidewall or frame members 40 and front member 42. The members 40 and 42 extend upwardly from the platform. As seen in FIGS. 2 and 3, with the belt 16 fully extended, front member 42 substantially abuts the forward wall 44 of the trailer. A set of longitudinally extending tracks or rails 46 is mounted to the underside of a trailer roof 48 on opposite sides of the trailer. Rollers 50 ride in the rails and are connected for rotation to the top of the cage side members 40 in the manner shown in FIG. 6, so that the cage is supported from the rails through the rollers.

In use, the trailer is loaded with the belt drawn rearwardly so as to bring the cage to the rear of the trailer. The cage is then filled with cargo, using the sides and front of the cage to load against at the start of loading. The cage and belt are then drawn toward the front of the trailer by applying a sufficient force to cable 32 and loading continues on the belt until the belt is fully extended into the trailer as shown in FIG. 2, at which time the trailer will be fully loaded. To unload the trailer, a force sufficient to move the belt and platform is applied to the belt. During the unloading procedure, the cage prevents the cargo from tumbling or falling off the transfer assembly as the platform approaches the open end of the trailer. The belt 16 and cable 32 are driven by a power assembly 52 during unloading and loading procedures respectively at which time the nondriven element is allowed to free-wheel.

As previously explained, the power assembly of the first embodiment is mounted at an associated loading dock 14 and means are provided on the belt and cable to enable coupling to the power assembly. The power assembly 12 consists of a belt take-up drum 54 and cable take-up roll 56. Drum 54 comprises a cylindrical member formed of a plurality of spaced-apart, longitudinally extending slats 58 welded at each end to end caps 60. The length of drum 54 is somewhat greater than the width of belt 16 and the spacing between slats 58 and the dimension of the slats is such as to enable connector 24 to be readily inserted between any two slats and to enter into a hooking engagement with a slat in the manner shown in FIG. 5. An idler pulley 62 guides the rear end of the belt to the take-up drum. Once the belt 16 has been hooked over a slat of the take-up drum and the drum is revolved, the additional layers of the belt wrapping around the drum securely hold connector 24 in position. The interior faces of end caps 60 are preferably radiused in such a way that should the belt track other than perfectly straight they would tend to lead the belt toward the center portion of the drum so as not to chafe the edges of the belt.

The cable take-up roll 56 is co-axial with the belt take-up drum 54. At least one hole 64 is provided extending into roll 56 thereby providing means for the connecting hook 38 of cable 32 to engage roll 56. A double clutch unit 66 is provided between take-up roll 56 and take-up drum 54 so that the motor or engine (not shown) which drives the clutch unit could be engaged either to rotate the floor belt take-up drum 54 to pull the load rearward or to rotate the cable take-up roll 56 which will exert a force on cable 32 through pulleys 34 and 36 to pull the floor belt and platform forward. The clutch could also be designed so that when power is applied to one unit the other unit free-wheels to permit belt 16 to move in the desired direction.

Figure 4:
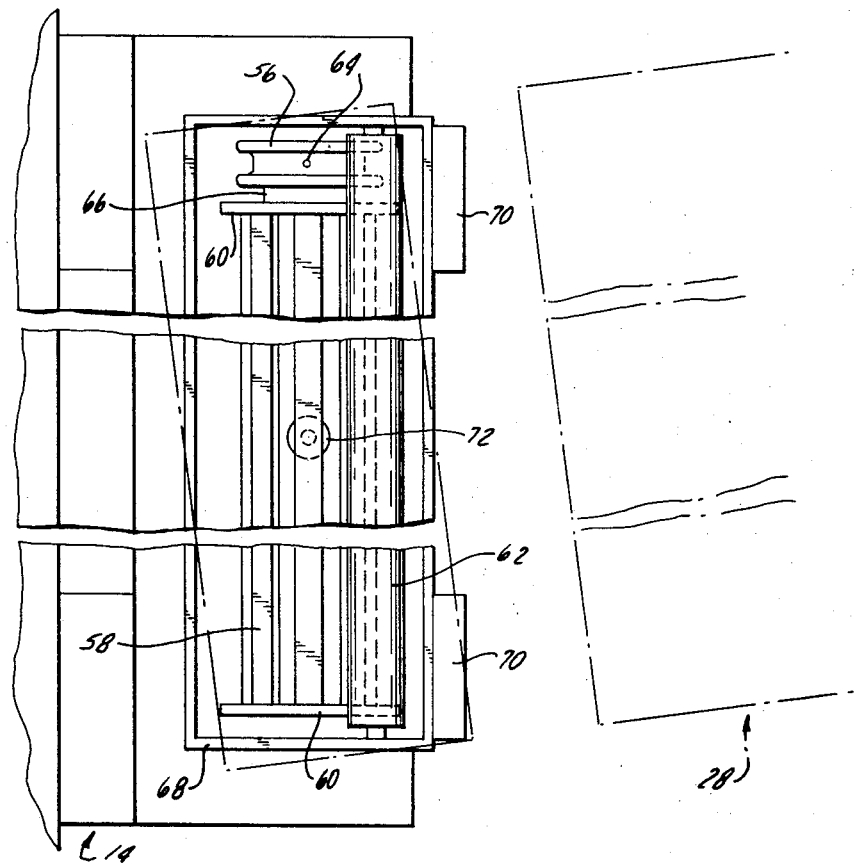
FIG. 4 is an enlarged plan view of a loading dock in accordance with the first embodiment of the present invention.
Figure 5:
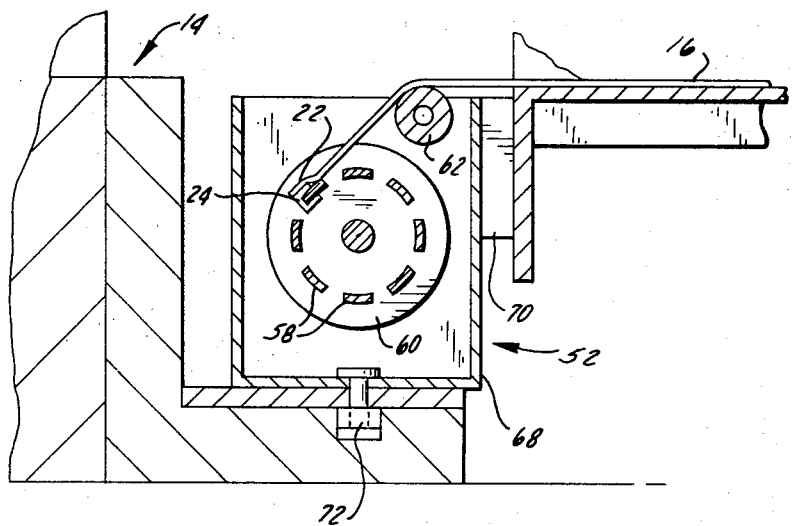
FIG. 5 is an enlarged side elevational sectional view taken along reference line 5—5 of FIG. 3 in the direction indicated by the arrows.
Figure 7:
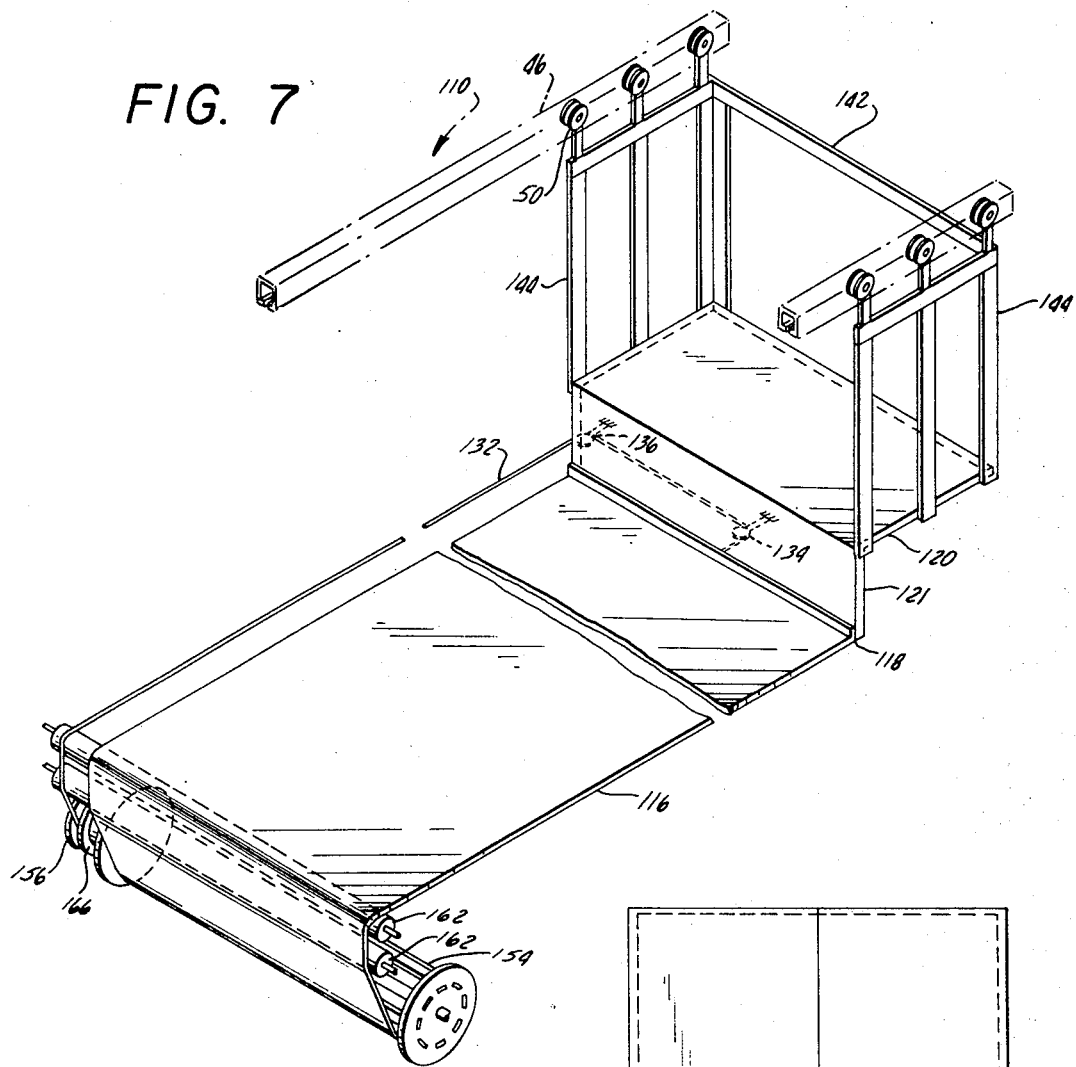
FIG. 7 is a schematic representation similar to FIG. 1 for the second embodiment of the present invention wherein the entire transfer assembly is mounted within a trailer having a raised forward portion.

Reference is now made to FIGS. 4 and 5 wherein details of the power unit 52 are disclosed. The unit 52 extends from the loading dock of a factory, warehouse, or similar installation and is contained within a housing 68 formed of a sufficiently rugged material to withstand weather and abuse. A pair of bumpers 70 is provided on the forward wall of housing 68. As shown most clearly in FIG. 5, the entire power assembly 52 is spaced apart from the loading dock and pivotally mounted about a central shaft 72 which extends into the loading dock foundation. The bumpers 70 are on either side of shaft 72. As shown in exaggerated form in FIG. 4, this arrangement enables the power assembly 52 to self-align with a trailer truck should the trailer truck be backed into the power assembly at an angle, not perfectly aligned with the loading dock 14 since the power assembly will pivot about shaft 72 so that it can line up parallel with the back end of the truck. That is, as soon as the truck contacts one bumper of power assembly 52 the entire unit will rotate until the other power assembly bumper also contacts the back of the truck at which time the power assembly will be parallel to the back of the truck. A second embodiment of the present invention is illustrated in FIGS. 7-10. In this alternate embodiment, the cargo transfer assembly 110 is shown with a trailer 112 which has a raised forward portion 114. Raised portion 114 is designed to fit over the rear portion of the associated tractor. This raised portion is commonly known as the trailer "bandstand."

As with the first embodiment, the cargo transfer assembly 110 of the second embodiment utilizes a belt 116, the forward end 118 of which is connected to a platform 120. As with the first embodiment, a front wall member 142 and side wall members 144 extend upwardly from platform 120 forming a cage about the platform. Also, the side wall members 144 are supported from overhead rails through rollers in a manner identical to that illustrated in FIG. 6. For convenience, the corresponding reference numerals of the first embodiment have been applied to the overhead rail assembly of the second embodiment. To compensate for the "bandstand," the platform 120 must be supported at a height to enable it to pass over the bandstand portion of the trailer with a minimum of lost space. A vertical wall member 121 connects the forward end 118 of belt 116 with the rear of platform 120.

As with the first embodiment, a cable 132 extends from the front 118 of belt 116 about pulleys 134 and 136 and then rearwardly. The transfer assembly may thus be moved rearwardly by applying a sufficient force to the belt and forwardly by applying a sufficient force to the cable.

Figure 10:
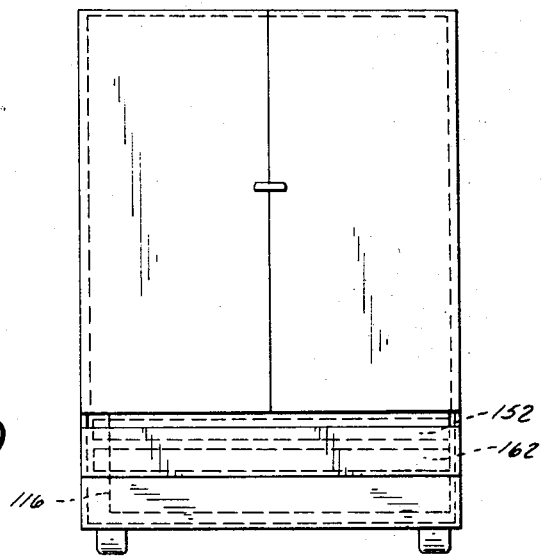
Figure 8:
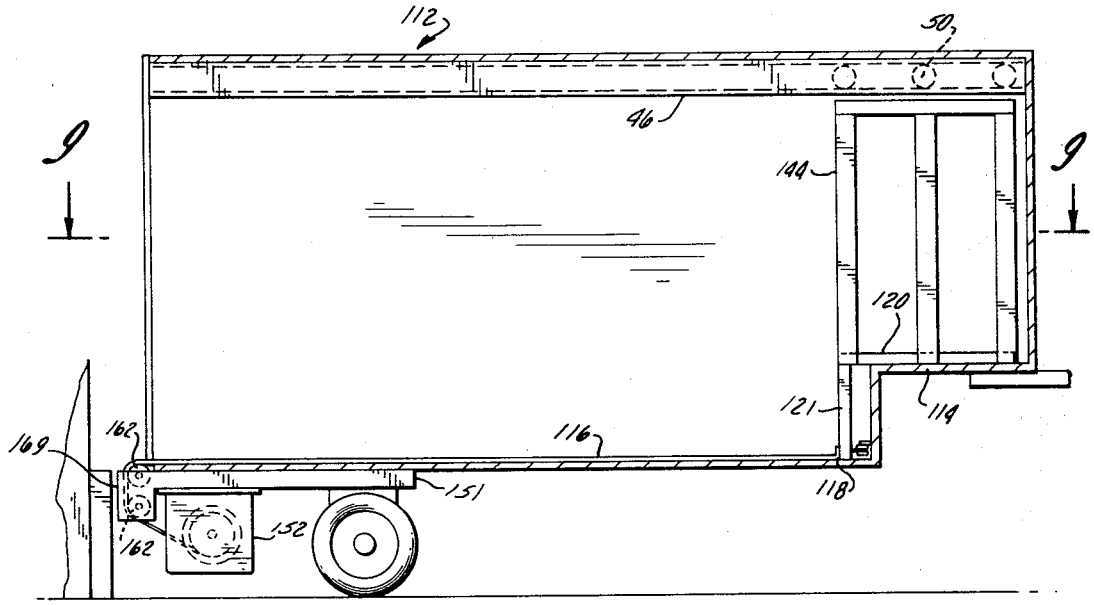
FIG. 8 is a side elevational sectional view similar to FIG. 2 for this second embodiment.
Figure 9:
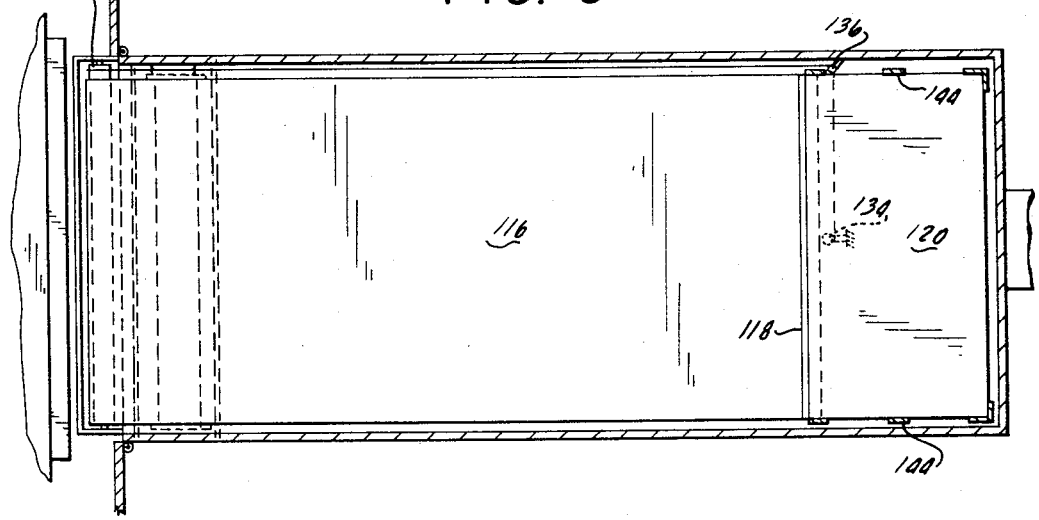
FIG. 9 is a sectional view taken along reference line 9—9 of FIG. 8 in the direction indicated by the arrows; and, FIG. 10 is a rear view of a trailer provided with the second embodiment of the cargo transfer assembly of the present invention.

Referring now to FIGS. 8–10, it may be noted that a power assembly 152 for this alternate embodiment is provided, mounted to the underframe 151 of trailer 112 transverse to the truck bed. The power assembly 152 includes a cable take-up drum 154 and a co-axial cable take-up roll 156, the construction of both of which is substantially identical to that of the corresponding parts of the first embodiment. A pair of idler pulleys 162 guides the belt 116 and cable 132 to their respective take-up units. The idlers are protected by bumper 163. The belt 116 and cable 132 may be permanently connected to their associated take-up devices or they may be removably coupled in the same fashion as the first embodiment.

The power for the drive assembly 152 may come from the truck with which the trailer is associated or it may comprise a separate unit. As with the first embodiment, a double clutch arrangement 166 may be used to enable operation of the cargo transfer assembly in either the forward or rearward direction through a single power source.

With both embodiments, the trailer is loaded with the belt wound about its associated take-up roll and the platform at the trailer rear. The initial portion of the load is used to fill the platform and is loaded against the side and front walls of the cage surrounding the platform. The platform and belt are then shifted forwardly by applying torque to the cable take-up roll and allowing the drum to free-wheel. Cargo is then placed on the portion of the belt then at the rear of the trailer and when this portion of the belt is filled, the belt is moved forwardly a distance sufficient to bring the next section of the belt to be loaded to the rear of the trailer and the process is repeated, shifting the load forwardly row by row until the trailer is completely filled. To unload the trailer, the reverse procedure is followed, applying the necessary torque to the belt take-up drum while the cable roll free-wheels.

Thus, in accordance with the above, the afore-mentioned object is effectively attained. It should be understood that modifications may be made in the illustrated and described embodiments of the present invention without departing from the invention as set forth in the accompanying claims.

Having thus described the invention what is claimed is:

1. A cargo transfer assembly for use in the loading and unloading of a truck trailer having a cargo area defined between the trailer front and rear ends and side walls, top and bed to or from a dock area, said transfer assembly comprising:

a longitudinally shiftable floor conveyor belt overlying the bed of the trailer and extending into the trailer from said rear end thereof, said belt being substantially coextensive in width with said cargo area and having a first end at said trailer rear end and a second end extending toward the front of said trailer:

a take-up drum at least as long as the width of said belt disposed at one of said areas with its longitudinal axis transverse to that of said belt;

means operatively connected to said drum for rotating said drum;

means connected to said belt first end for operatively coupling said first end to said take-up drum whereby said belt winds about said drum during the rotation of said drum;

cable means having one end coupled to said belt second end and another end adapted to be coupled to a cable take-up means;

cable take-up means disposed at said one area;

means for coupling said cable other end to the cable take-up means whereby said belt take-up means and said cable cooperate in supporting said belt for longitudinal movement along the bed of said trailer;

a platform coextensive in width with said belt and coupled to the front end of said belt for movement therewith;

a cage defined by members extending upwardly from the front and sides of said platform;

track means affixed to the top of said trailer and roller means affixed to some of said cage members and adapted to ride in said track means whereby to further support said platform and belt for longitudinal movement within said trailer;

and said cargo area includes a raised portion extending rearwardly from the trailer front end and said platform is supported from said track means at a height sufficient to clear said trailer raised portion.

2. The invention in accordance with claim 1 wherein said cable take-up drum comprises a pair of spaced apart end caps, and a plurality of elongated slats extending between said end caps disposed in a spaced apart cylindrical array and said belt coupling means comprises a hook member affixed to said belt first end and adapted to engage said take-up drum between adjacent slats.

3. The invention in accordance with claim 1 wherein said belt and cable take-up means are coupled to said trailer.

4. A cargo transfer assembly for use in the loading and unloading of a truck trailer having a cargo area defined between the trailer front and rear ends and side walls, top and bed to or from a dock area, said transfer assembly comprising:

a longitudinally shiftable floor conveyor belt overlying the bed of the trailer and extending into the trailer from said rear end thereof, said belt being substantially coextensive in width with said cargo area and having a first end at said trailer rear end and a second end extending toward the front of said trailer;

a take-up drum at least as long as the width of said belt disposed at one of said areas with its longitudinal axis transverse to that of said belt;

means operatively connected to said drum for rotating said drum;

means connected to said belt first end for operatively coupling said first end to said take-up drum whereby said belt winds about said drum during the rotation of said drum;

cable means having one end coupled to said belt second end and another end adapted to be coupled to a cable take-up means;

cable take-up means disposed at said one area;

means for coupling said cable other end to the cable take-up means whereby said belt take-up means and said cable cooperate in supporting said belt for longitudinal movement along the bed of said trailer;

said belt take-up drum and cable take-up means are mounted in a housing disposed at said dock area and said belt and cable coupling means are adapted to be shifted between engaging and disengaging positions with respect to their respective take-up members; and said housing is pivotally mounted about a vertical shaft whereby said housing will self align with a trailer backed against said housing.

5. The invention in accordance with claim 4 wherein said belt take-up drum and cable take-up roll are coaxial and further comprising double acting clutch means interposed between said take-up elements.

* * * * *